US006839861B2

(12) United States Patent
Hoke et al.

(10) Patent No.: US 6,839,861 B2
(45) Date of Patent: Jan. 4, 2005

(54) METHOD AND SYSTEM FOR SELECTING DATA SAMPLING PHASE FOR SELF TIMED INTERFACE LOGIC

(75) Inventors: Joseph Michael Hoke, Millerton, NY (US); Frank D. Ferraiolo, Essex, VT (US); Tin-Chee Lo, Fishkill, NY (US); John Michael Yarolin, Williston, VT (US)

(73) Assignee: International Business Machines Corporation, Armonk, NY (US)

( * ) Notice: Subject to any disclaimer, the term of this patent is extended or adjusted under 35 U.S.C. 154(b) by 729 days.

(21) Appl. No.: 09/918,081

(22) Filed: Jul. 30, 2001

(65) Prior Publication Data
US 2003/0023891 A1 Jan. 30, 2003

(51) Int. Cl.[7] .................................................. G06F 1/04
(52) U.S. Cl. ........................................ 713/401; 713/503
(58) Field of Search ................................ 713/400, 401, 713/503, 600

(56) References Cited
U.S. PATENT DOCUMENTS

| 5,287,020 | A | | 2/1994 | Kimura et al. |
|---|---|---|---|---|
| 5,304,855 | A | | 4/1994 | Naufel |
| 5,313,501 | A | * | 5/1994 | Thacker ..................... 375/369 |
| 5,487,095 | A | | 1/1996 | Jordan et al. |
| 5,513,377 | A | | 4/1996 | Capowski et al. |
| 5,519,737 | A | | 5/1996 | Brun et al. |
| 5,522,088 | A | | 5/1996 | Halma et al. |
| 5,535,377 | A | | 7/1996 | Parks |
| 5,568,526 | A | | 10/1996 | Ferraiolo et al. |
| 5,598,442 | A | | 1/1997 | Gregg et al. |
| 5,668,830 | A | * | 9/1997 | Georgiou et al. ........... 375/220 |
| 5,790,560 | A | | 8/1998 | Durham et al. |
| 5,832,047 | A | | 11/1998 | Ferraiolo et al. |
| 5,872,959 | A | * | 2/1999 | Nguyen et al. ............. 713/401 |
| 6,185,693 | B1 | | 2/2001 | Garmire et al. |
| 6,192,482 | B1 | | 2/2001 | Casper et al. |
| 6,374,361 | B1 | * | 4/2002 | Lee et al. .................... 713/503 |

FOREIGN PATENT DOCUMENTS

| EP | 687980 A2 | 12/1995 |
|---|---|---|
| EP | 687982 A1 | 12/1995 |
| EP | 687986 A2 | 12/1995 |

OTHER PUBLICATIONS

J.J. Pertzborn, IBM TDB "Digital Clock Synchronization Circuit", vol. 22, pp. 311–314.

* cited by examiner

Primary Examiner—Dennis M. Butler
(74) Attorney, Agent, or Firm—Floyd A. Gonzales; Cantor Colburn LLP

(57) ABSTRACT

An exemplary embodiment of the present invention is a method for transmitting data among processors over a plurality of parallel data lines and a clock signal line. A receiver processor receives both data and a clock signal from a sender processor. At the receiver processor a bit of the data is phased aligned with the transmitted clock signal. The phase aligning includes selecting a data phase from a plurality of data phases in a delay chain and then adjusting the selected data phase to compensate for a round-off error. Additional embodiments include a system and storage medium for transmitting data among processors over a plurality of parallel data lines and a clock signal line.

15 Claims, 5 Drawing Sheets

US 6,839,861 B2

METHOD AND SYSTEM FOR SELECTING DATA SAMPLING PHASE FOR SELF TIMED INTERFACE LOGIC

GOVERNMENT RIGHTS

This invention was made with Government support under subcontract B338307 under prime contract W-7405-ENG-48 awarded by the Department of Energy. The Government has certain rights in this invention.

FIELD OF THE INVENTION

The present invention relates generally to an improved method and apparatus for transmitting data at high speeds via a parallel data bus, and more particularly to an improvement in the accuracy of selecting the data sampling phase for self-timed interface logic.

BACKGROUND OF THE INVENTION

In many instances data must be transferred between multiple computer components or computer nodes. An example is data transfer between two microprocessors. One way to perform the data transfer is to have a set of latches in the sender microprocessor launch the data through a set of off-processor drivers and into a set of cables. The receiver microprocessor could interface to these cables through a set of off-processor receivers that first amplify the respective signals and then load them into a set of receiving latches which are strobed by a clock sent from the sender microprocessor. With this arrangement, the receiver clock and the sender clock maintain a fixed relationship in time. The off-processor drivers, the cable, and the off-processor receivers form a link between the two microprocessors. The delay times of the off-processor drivers and the off-processor receivers, and the cable length determine the latency of the link.

Although the data for each cable is launched at the same time, the data arrival times at the receiving end may be different due to variations in the link characteristics. Ideally, the data signal should be centered at the sampling edge of the received clock. Because of the variations in data arrival times, the received signals may need to be phase-aligned with respect to the sampling edge of the received clock in order to be properly captured by the receiving registers. A self-timed interface (STI) can be used to align the incoming data bits so that they will be captured by the received clock in a more reliable manner. STI is disclosed in U.S. Pat. No. 5,568,526, entitled Self Timed Interface. U.S. Pat. No. 5,568,526 is assigned to the assignee of the present invention and is incorporated herein by reference. A STI includes a clock signal that clocks bit serial data onto a parallel, electrically conductive bus and the clock signal is transmitted on a separate line of the bus. The received data on each line of the bus is individually phase aligned with the clock signal. The received clock signal is used to define boundary edges of a data bit cell individually for each line and the data on each line of the bus is individually phase adjusted so that, for example, a clock transition is positioned in the center of the data bit cell.

An embodiment of STI can include incoming signals in the receiver microprocessor being sent to the input of a delay line with multiple taps. The delay line can consist of multiple delay elements with the output of each delay element representing a phase of the incoming signal. This allows multiple phases to be generated with progressively increasing off-sets. STI control logic selects one of these phases by locating the phase that comes closest to aligning the midpoint of the data window with the sampling edge of the received clock. A built in mechanism locks the selected phase and makes the self-adjustment dynamically. The transition edges of a data bit can be found by an edge detection mechanism such as the one disclosed in U.S. Pat. No. 5,487,095, entitled Edge Detector. U.S. Pat. No. 5,487,095 is assigned to the assignee of the present invention and is incorporated herein by reference.

In the current implementation of STI a round-off error may occur that causes the selected tap to be taken slightly too late or slightly too early relative to the mid-point of the data window.

SUMMARY OF THE INVENTION

An exemplary embodiment of the present invention is a method for transmitting data among processors over a plurality of parallel data lines and a clock signal line. A receiver processor receives both data and a clock signal from a sender processor. At the receiver processor a bit of the data is phase aligned with the transmitted clock signal. The phase aligning includes selecting a data phase from a plurality of data phases in a delay chain and then adjusting the selected data phase to compensate for a round-off error. Additional embodiments include a system and storage medium for transmitting data among processors over a plurality of parallel data lines and a clock signal line.

DETAILED DESCRIPTION OF THE INVENTION

Figure 1:
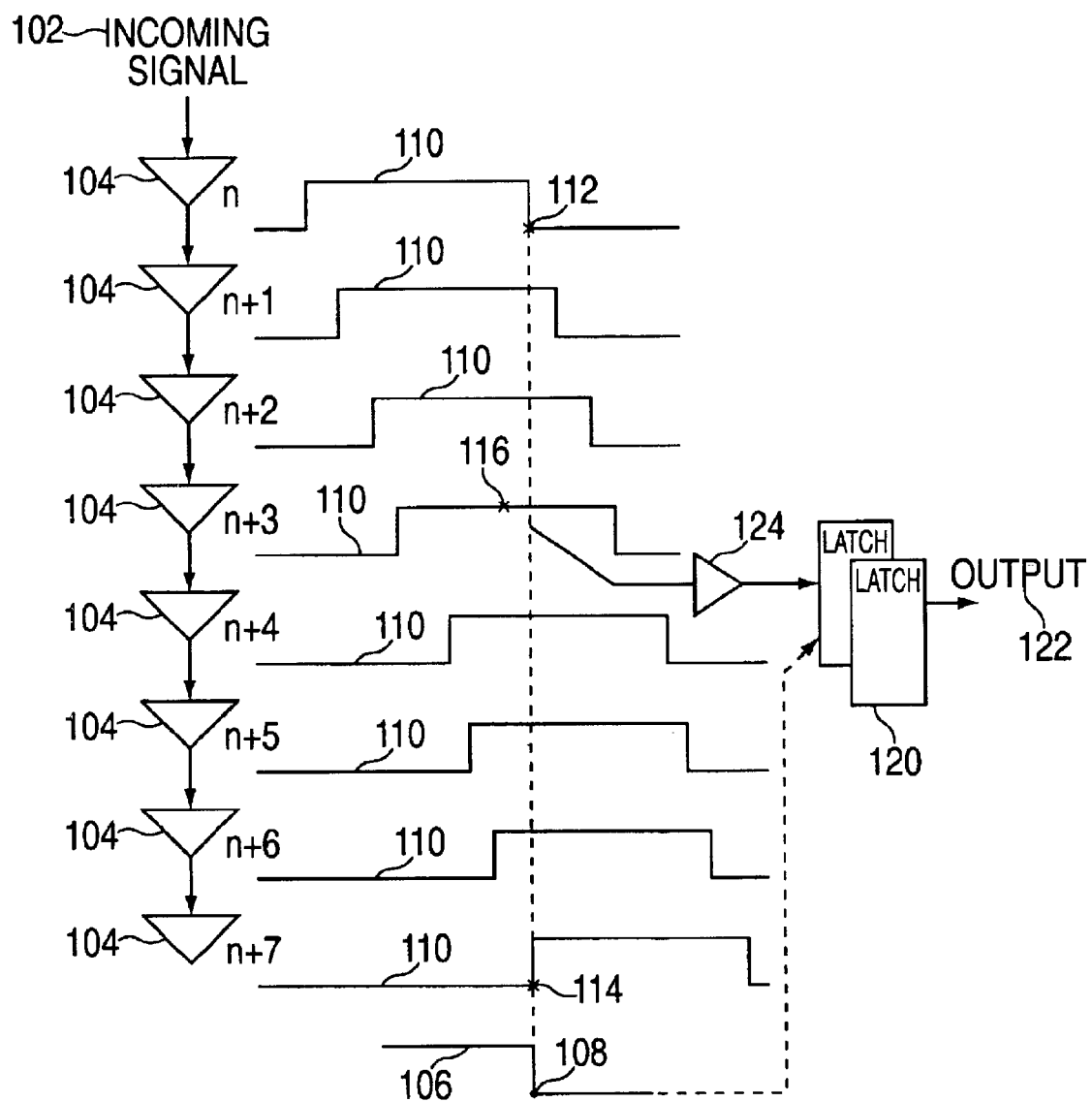
FIG. 1 depicts the delay elements of an exemplary self-timed interface circuit with improved data sampling accuracy.

The present invention discloses a method to detect and then to reduce or remove the round-off error that may occur when the self-timed interface (STI) logic selects one of the incoming signal phases. FIG. 1 is an overview of how an exemplary embodiment of the present invention fits into a sample STI delay chain architecture at the receiver microprocessor. According to an embodiment of the present invention, a half-delay 124 is inserted into the delay chain in order to improve the accuracy of the data sampling. The rest of FIG. 1 depicts an example STI delay chain architecture as is known in the art. Each incoming signal 102 in the receiver multiprocessor is sent to a delay line with multiple delay elements 104. The output of each delay element 104 represents a phase of the incoming signal 102. In this manner a large number of phases 110 are generated with progressively increasing offsets. The optimum time to sample the data is when the sampling edge 108 of the clock 106 is aligned with the midpoint 116 of the signal phase 110. The midpoint 116 is in reference to the leading edge 114 and the trailing edge 112 of the signal. The selected phase is strobed into the latch 120 using clock 106 and then to output 122.

In FIG. 1 the midpoint 116 is not aligned with the sampling edge 108 of the clock 106 in any of the phases generated by the delay chain. To make the sampling more accurate an embodiment of the invention introduces a half-delay 124. The half-delay 124 is similar to the delay line elements 104 except that the delay time is shortened by half. The output of the half-delay 124 produces a new phase whose mid-point aligns with the falling edge 108 of the clock 106.

Figure 5:
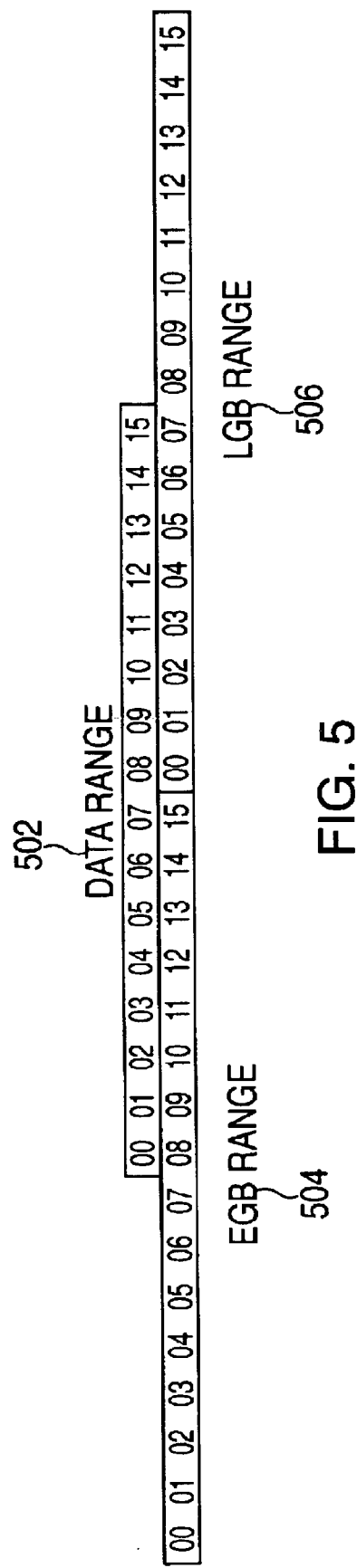
FIG. 5 is an example of how STI inverters can be partitioned.

As is known in the art, the STI delay chain can be divided into several logical groups. FIG. 5 depicts an example where the delay chain contains thirty-two inverters as the delay elements. The Early Guard Band (EGB) Range 504 includes the first sixteen inverters within which the trailing edge 112 is intended to occur. The Late Guard Band (LGB) Range 506 includes the last sixteen inverters within which the leading edge 114 is intended to occur. The Data Group Range 502 includes the middle sixteen inverters where the data to be sampled is expected to occur. Because the delay elements are implemented with inverters, the polarities of the phases alternate from inverter to inverter. The output of the even numbered inverters represent the "true tap" and the odd numbered inverters represent the "false tap." Inverters are selected in pairs, the "nth" pair including inverter "n" and inverter "n+1."

Figure 4:
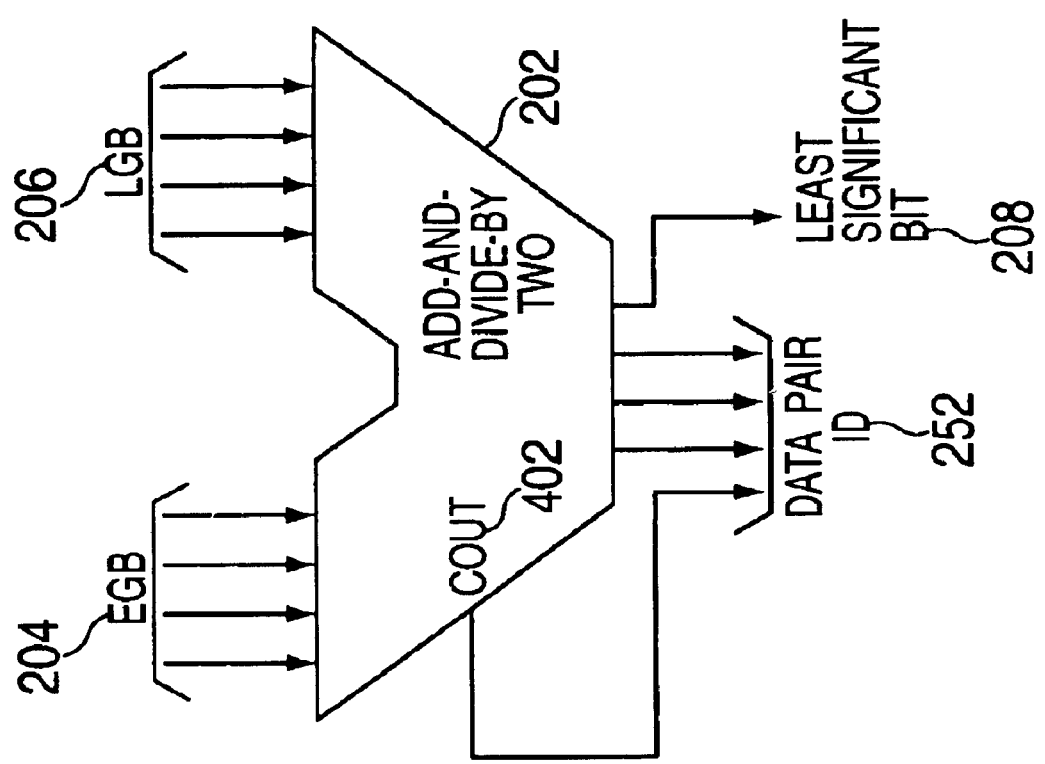
FIG. 4 is a block diagram that depicts the add-and-divide-by-two process.

An embodiment of the present invention includes determining whether a round-off error has occurred. This can be performed using the output of existing STI control logic. An algorithm to find the inverter pair number that contains the midpoint 116 of the data window can include adding the EGB and the LGB and then dividing by two. FIG. 4 depicts a block diagram of an exemplary add-and-divide-by-two process. The inputs to the add-and-divide-by-two logic 202 include the LGB 206 and the EGB 204. The LGB 206 is the binary address of the inverter in the LGB Range 506 that contains the leading edge 114 of the incoming signal 102. Similarly, the EGB 204 is the binary address of the inverter in the EGB Range 504 that contains the trailing edge 112 of the incoming signal 102. FIG. 4 also depicts the outputs of the add-and-divide-by-two logic 202 which include the data pair identification 252, the least significant bit 208 of the sum of EGB 204 and LGB 206, and the Carry-Out (COUT) 402. The data pair identification 252 is the binary address of the inverter pair that contains the data phase to be sampled.

For example, referring to FIG. 1, EGB 204 would be at "n" and LGB 206 would be at "n+7". Therefore, the inverter pair number that contains the midpoint would be calculated as ("n"+"n+7")/2, resulting in the data pair identification 252 of "n+3." In an exemplary embodiment of the present invention the least significant bit (LSB) 208 of the sum of LGB 206 and EGB 204 is used to indicate the existence of a round-off error. If the LSB 208 is "0" then no round-off error has occurred. If the LSB 208 is "1" then a round-off error has occurred and the half-delay should be introduced into the delay chain in order to improve the accuracy of the sampled data. In this example, LSB would be equal to "1" and therefore a round-off error has occurred and the half-delay should be introduced into the delay chain.

Figure 2:
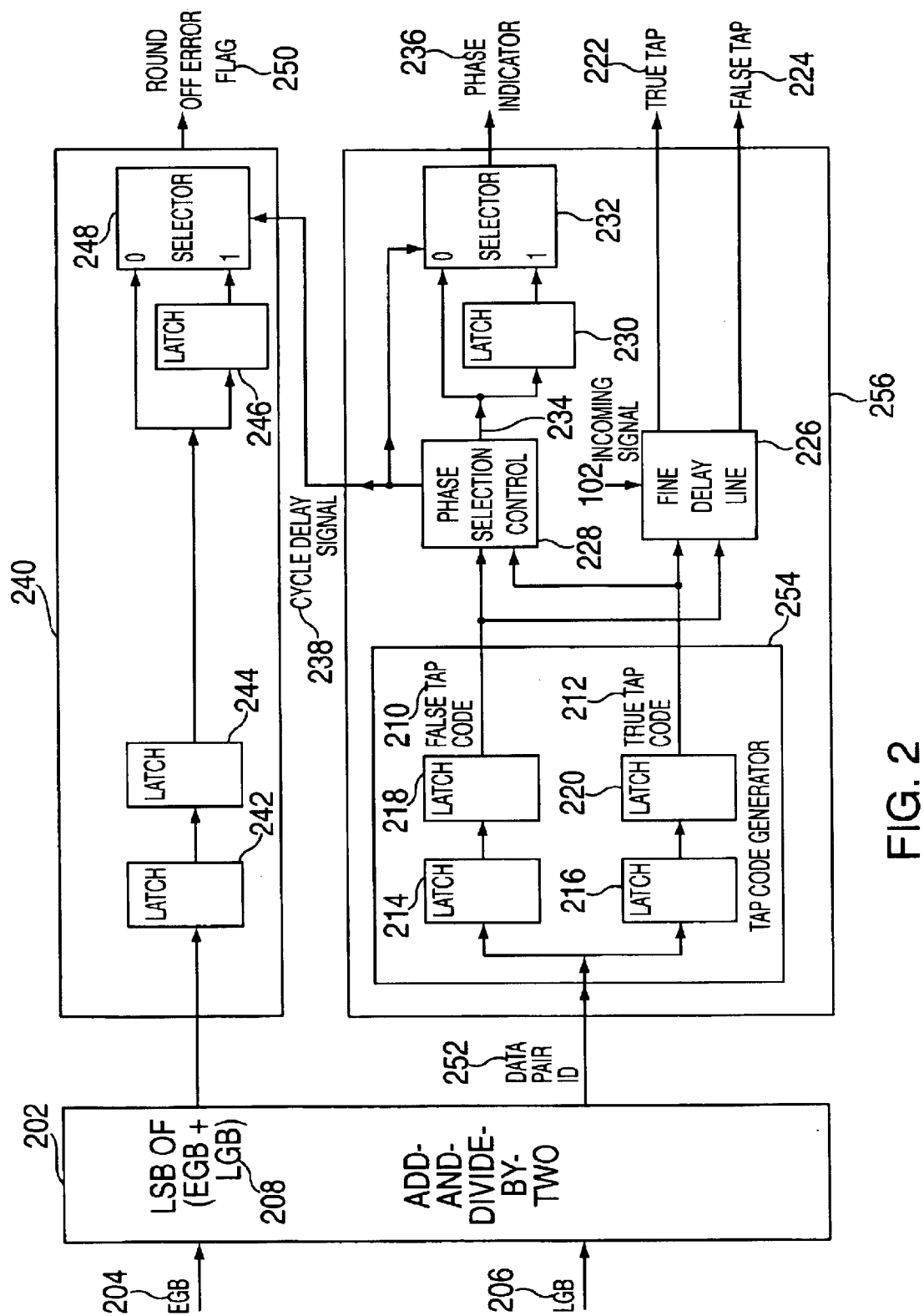
FIG. 2 depicts an example of data sampling control logic for an exemplary embodiment of the present invention.

An embodiment of the present invention utilizes the STI architecture as is known in the art with the addition of the ability to insert the half-delay as needed to achieve improved data sampling. The half-delay logic may be performed in parallel with the other STI control logic. FIG. 2 depicts an exemplary manner of adding the half-delay control logic 240 to the STI control logic 256. The STI control logic 256 shown produces an indicator 236 of which data phase of the inverter pair (the true tap 222 or the false tap 224) should be selected for data sampling. Additional outputs include the true tap 222 and the false tap 224. The inputs to the add-and-divide-by-two logic 202 portion of STI include the EGB 204 and the LGB 206.

As discussed previously, the add-and-divide by two logic 202 of STI includes finding the midpoint inverter data pair identification 252 of the EGB 204 and the LGB 206 using add-and-divide-by-two logic 202. The LSB 208 of the adder is input into the half-delay logic 240 and the data pair identification 252 is input to the STI control logic 256. In an exemplary STI implementation the data pair identification 252 is input to the tap code generator 254 portion of the STI control logic 256. The tap code generator 254 produces the false tap code 210 and the true tap code 212. The tap codes 210 and 212 represent the address of the inverters containing the data to be sampled. In an exemplary embodiment, the true tap code 212 and the false tap code 210 are both used as inputs into the phase selection control 228 and the fine delay line 226 portions of the STI control logic 256. Additional input to the fine delay line 226 includes the incoming signal 102. The fine delay line 226 generates the true tap 222 and the false tap 224 data phases.

The phase selection control 228 generates the cycle delay signal 238. It also generates output 234 that is used as input into the latch 230 and selector 232 that are used to control whether an extra cycle should be inserted into the STI control logic 256. The cycle delay may be required by the STI control logic 256 in order to obtain more accurate data samples. For example, a delay may be required by STI control logic 256 when an even inverter pair address is decremented or when an odd inverter pair address is decremented. The STI control logic 256 determines the need for an additional cycle and communicates the presence of the additional cycle to the half-delay logic 240 through a flag such as the cycle delay signal 238. Selector 248 selects either the output of latch 244 or latch 246 in response to the cycle delay signal 238.

The half-delay logic 240 of an embodiment of the present invention includes the same number of latches as the parallel STI control logic 256 in order to produce the round-off error flag 250 in the same clock cycle as the phase indicator 236. The round-off error flag 250 signals whether a half-delay should be applied to the selected data phase. In this example, the half-delay logic 240 contains two latches 242, 244 and one optional latch 246. Latch 242 corresponds to the STI control logic 256 parallel latches 214, and 216. Latch 244 corresponds to the parallel latches 218, and 220. Latch 246 is an optional latch and will be exercised if the cycle delay signal 238 from the STI control logic 256 indicates that the cycle delay should occur. Optional latch 246 corresponds to latch 230 which is a STI latch exercised for certain combinations of inverter addresses as is known in the art.

Figure 3:
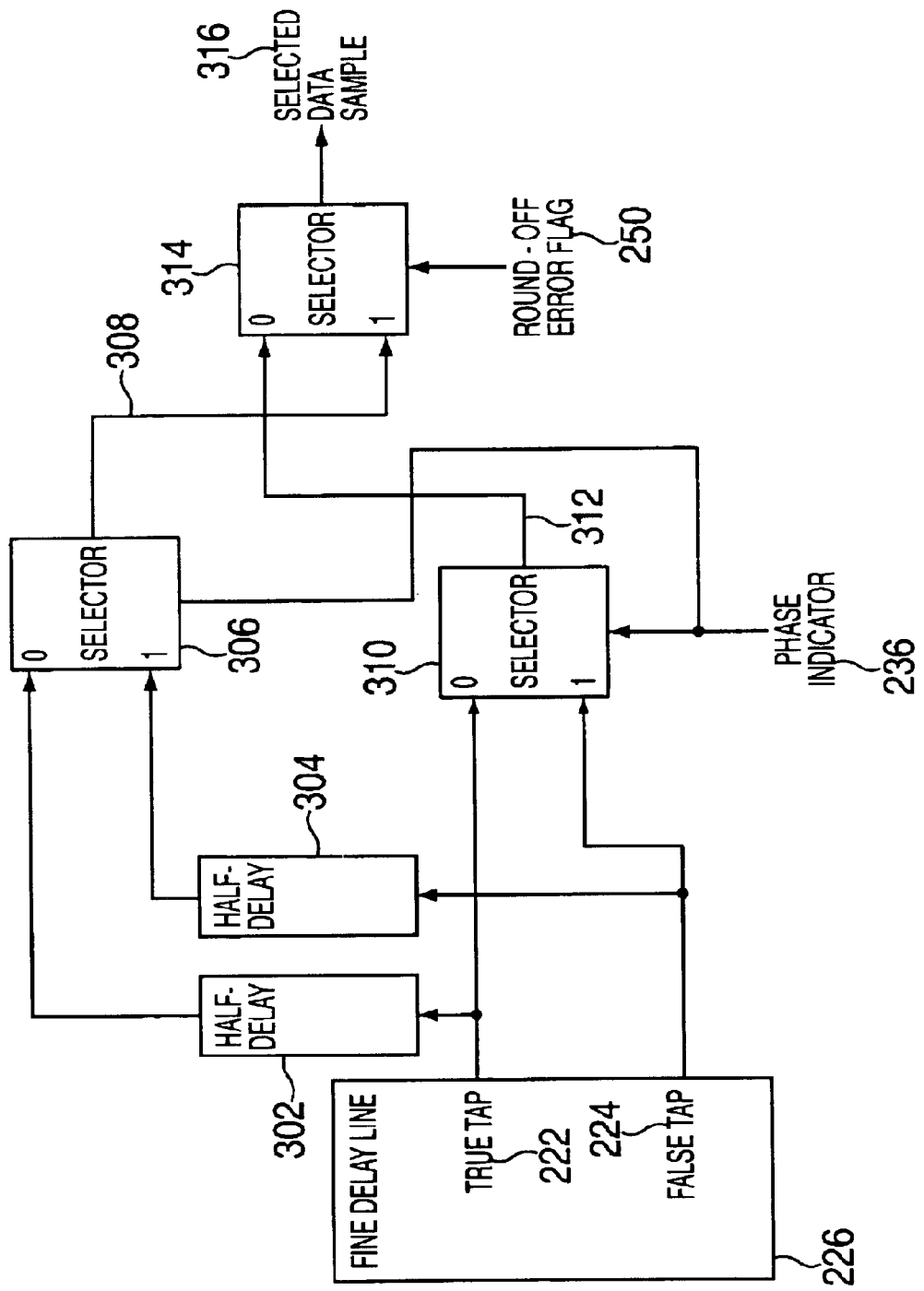
FIG. 3 is a block diagram of an exemplary embodiment of the present invention.

FIG. 3 is a block diagram of an exemplary embodiment of the present invention that implements the half-delay after the round-off error flag 250, the phase indicator 236, the false tap 224, and the true tap 222 have been determined as discussed in reference to FIG. 2. The true tap 222 from the fine delay line logic 226 is input into a half-delay (e.g. half-inverter) 302 to create a data phase that is one half-delay later than the true tap 222. Similarly, the false tap 224 is input into a half-delay (e.g. half-inverter) 304. The phase indicator 236 is then used to determine whether the true tap 222 or the false tap 224 should be selected. When the value of the phase indicator 236 is "0" the true tap of the inverter pair is selected and when the phase indicator 236 is "1" the false tap of the inverter pair is selected. The phase indicator 236 is input into both the original STI selector 310 and the new half-delay selector 306 in order to select the true or false tap. The results 312 and 308 from both selectors 310 and 306 are input to a third, new selector 314. Also input into this selector 314 is the round-off error flag 250. The round-off error flag 250 is used to determine whether the half-delay should be applied in order to remove a round-off error or whether the phase from the standard STI delay element should be selected. If the round-off error flag 250 is equal to "0" then no half-delay is necessary because no round-off error has occurred. If the round-off error flag 250 is equal to "1" then the phase from the half-delay element should be selected because a round-off error has occurred. Based on the value of the round-off error flag 250 a data sample is selected 316.

The present invention provides at least one improvement over the current state of the art in STI by providing a method to reduce or eliminate the round-off error associated with data sampling. This allows for more accurate data sampling by aligning the correction of the round-off error with the rest of the STI control logic.

As described above, the present invention can be embodied in the form of computer-implemented processes and apparatuses for practicing those processes. The present invention can also be embodied in the form of computer program code containing instructions embodied in tangible media, such as floppy diskettes, CD-ROMs, hard drives, or any other computer-readable medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation to the teachings of the invention without departing from the essential scope thereof. Therefore, it is intended that the invention not be limited to the particular embodiments for carrying out this invention, but that the invention will include all embodiments falling within the scope of the appended claims.

What is claimed is:

1. A method for transmitting data among processors over a plurality of parallel data lines and a clock signal line, the method comprising:

receiving at a receiver processor data transmitted from a sender processor;

receiving at said receiver processor a clock signal transmitted from said sender processor;

phase aligning at said receiver processor a bit of said data with said clock signal, said phase aligning comprising:

selecting a data phase from a plurality of data phases in a delay chain;

checking for a round-off error in said selecting a data phase and setting a round-off error flag if said round-off error is present; and adjusting said selected data phase to compensate for said round-off error if said round-off error flag is set.

2. The method of claim 1 wherein said selecting a data phase from a plurality of data phases in a delay chain includes:

locating a late guard band inverter address in the delay chain that corresponds to a leading edge of said bit of said data;

locating an early guard band inverter address in the delay chain that corresponds to a trailing edge of said bit of said data;

calculating a midpoint inverter address in the delay chain by adding said late guard band inverter address to said early guard band inverter address and then dividing by two; and outputting said selected data phase, said selected data phase corresponding to said midpoint inverter address.

3. The method of claim 2 wherein said checking for a round-off error includes:

isolating a least significant bit of sum of said late guard band inverter address and said early guard band inverter address; and setting said round-off error flag if said least significant bit is an odd number.

4. The method of claim 1 wherein said adjusting said selected data phase includes:

sending said selected data phase into a half-delay; and outputting said adjusted data phase, said data adjusted data phase corresponding to output of said half-delay.

5. The method of claim 1 wherein said adjusting said selected data phase includes:

responding to a cycle delay signal.

6. A system for transmitting data among processors over a plurality of parallel data lines and a clock signal line, the system comprising:

a processor with the circuitry and logic to perform the method comprising:

receiving at a receiver processor data transmitted from a sender processor;

receiving at said receiver processor a clock signal transmitted from said sender processor;

phase aligning at said receiver processor a bit of said data with said clock signal, said phase aligning comprising:

selecting a data phase from a plurality of data phases in a delay chain;

checking for a round-off error in said selecting a data phase and setting a round-off error flag if said round-off error is present; and adjusting said selected data phase to compensate for said round-off error if said round-off error flag is set.

7. The system of claim 6 wherein said selecting a data phase from a plurality of data phases in a delay chain includes:

locating a late guard band inverter address in the delay chain that corresponds to a leading edge of said bit of said data;

locating an early guard band inverter address in the delay chain that corresponds to a trailing edge of said bit of said data;

calculating a midpoint inverter address in the delay chain by adding said late guard band inverter address to said early guard band inverter address and then dividing by two; and outputting said selected data phase, said selected data phase corresponding to said midpoint inverter address.

8. The system of claim 7 wherein said checking for a round-off error includes:
   isolating a least significant bit of sum of said late guard band inverter address and said early guard band inverter address; and
   setting said round-off error flag if said least significant bit is an odd number.

9. The system of claim 6 wherein said adjusting said selected data phase includes:
   sending said selected data phase into a half-delay; and
   outputting said adjusted data phase, said data adjusted data phase corresponding to output of said half-delay.

10. The system of claim 6 wherein said adjusting said selected data phase includes: responding to a cycle delay signal.

11. A storage medium encoded with machine-readable computer program code for transmitting data among processors over a plurality of parallel data lines and a clock signal line, the storage medium storing instructions for causing a computer system to implement a method comprising:
   receiving at a receiver processor data transmitted from a sender processor;
   receiving at said receiver processor a clock signal transmitted from said sender processor;
   phase aligning at said receiver processor a bit of said data with said clock signal, said phase aligning comprising:
   selecting a data phase from a plurality of data phases in a delay chain;
   checking for a round-off error in said selecting a data phase and setting a round-off error flag if said round-off error is present; and
   adjusting said selected data phase to compensate for said round-off error if said round-off error flag is set.

12. The storage medium of claim 11 wherein said selecting a data phase from a plurality of data phases in a delay chain includes:
   locating a late guard band inverter address in the delay chain that corresponds to a leading edge of said bit of said data;
   locating an early guard band inverter address in the delay chain that corresponds to a trailing edge of said bit of said data;
   calculating a midpoint inverter address in the delay chain by adding said late guard band inverter address to said early guard band inverter address and then dividing by two; and
   outputting said selected data phase, said selected data phase corresponding to said midpoint inverter address.

13. The storage medium of claim 12 wherein said checking for a round-off error includes:
   isolating a least significant bit of sum of said late guard band inverter address and said early guard band inverter address; and
   setting said round-off error flag if said least significant bit is an odd number.

14. The storage medium of claim 11 wherein said adjusting said selected data phase includes:
   sending said selected data phase into a half-delay; and
   outputting said adjusted data phase, said data adjusted data phase corresponding to output of said half-delay.

15. The storage medium of claim 11 wherein said adjusting said selected data phase includes:
   responding to a cycle delay signal.

* * * * *